No. 851,558. PATENTED APR. 23, 1907.
W. POLK.
MACHINE FOR FORMING PLASTIC ARTICLES.
APPLICATION FILED MAR. 24, 1906.
2 SHEETS—SHEET 1.
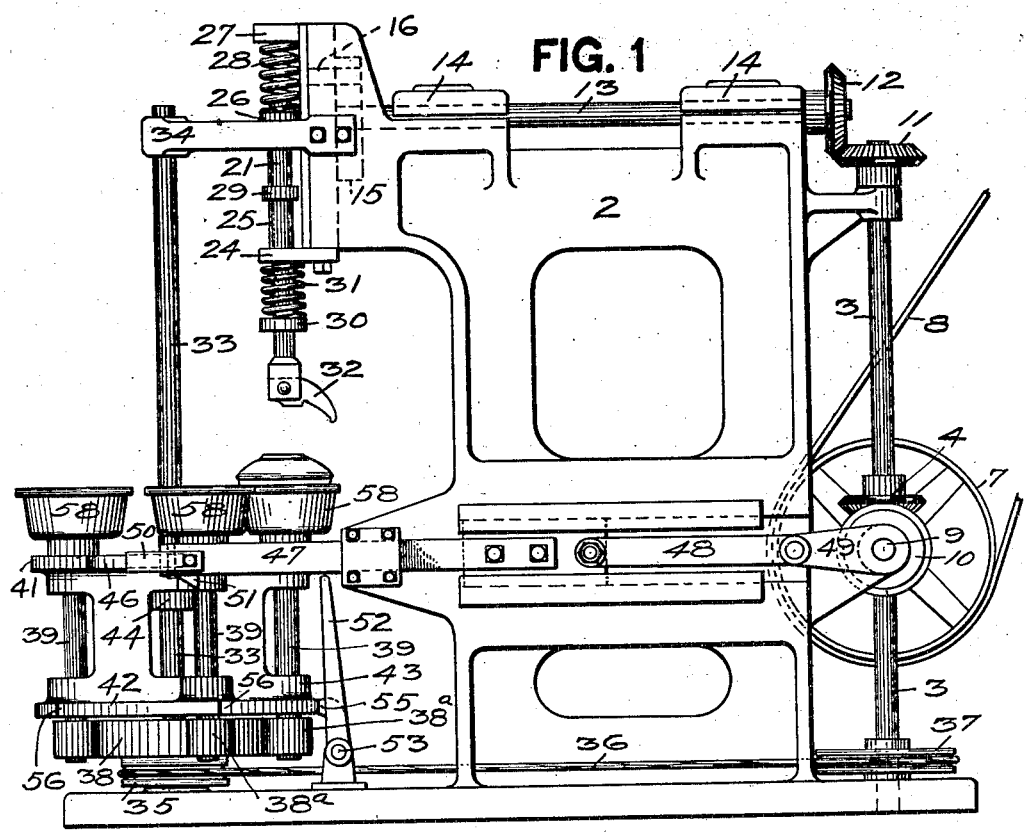
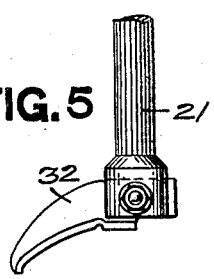
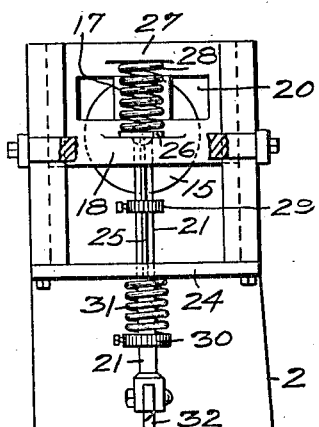
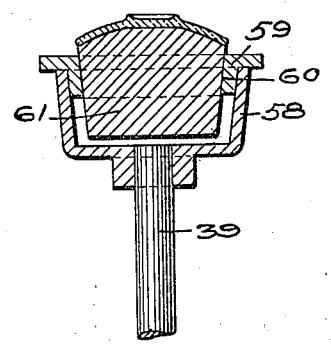
WITNESSES.
J. R. Keller
Robert C. Totter
INVENTOR.
William Polk
By Kay Totter & Winter
Attorneys No. 851,558. PATENTED APR. 23, 1907.
W. POLK.
MACHINE FOR FORMING PLASTIC ARTICLES.
APPLICATION FILED MAR. 24, 1906.

2 SHEETS—SHEET 2.

WITNESSES.

INVENTOR.

UNITED STATES PATENT OFFICE.

WILLIAM POLK, OF EAST LIVERPOOL, OHIO.

MACHINE FOR FORMING PLASTIC ARTICLES.

No. 851,558.　　　　　Specification of Letters Patent.　　　　Patented April 23, 1907.

Application filed March 24, 1906. Serial No. 307,884.

*To all whom it may concern:*

Be it known that I, WILLIAM POLK, a resident of East Liverpool, in the county of Columbiana and State of Ohio, have invented a new and useful Improvement in Machines for Forming Plastic Articles; and I do hereby declare the following to be a full, clear, and exact description thereof.

My invention relates to apparatus for shaping or forming tableware or other articles made of clay or other plastic material.

The object of my invention is to provide apparatus by means of which the shaping tool is operated automatically and the ware brought around in position to be operated upon by the shaping tool so that the only attention the apparatus requires is to have operators to feed the ware to the machine and remove it therefrom, thereby greatly reducing the labor and cost of production, as well as providing a machine of greatly increased capacity.

To these ends my invention comprises the novel features hereinafter set forth and claimed.

Figure 2:
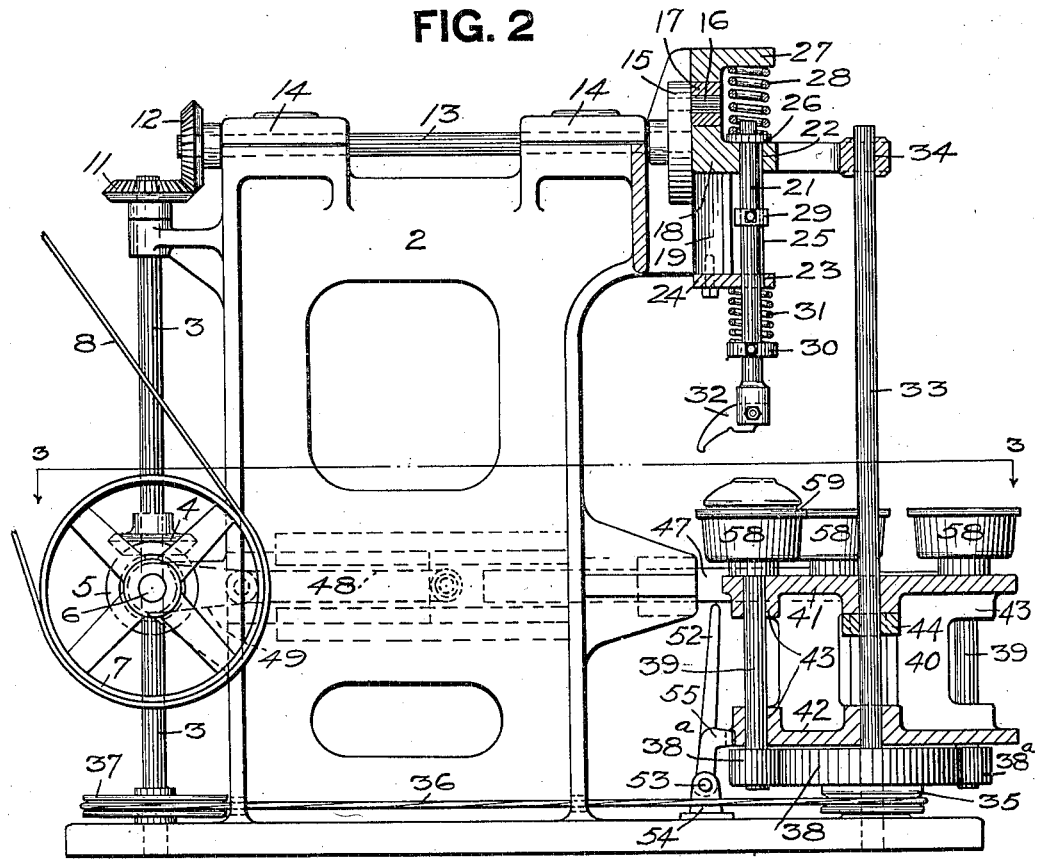
Figure 3:
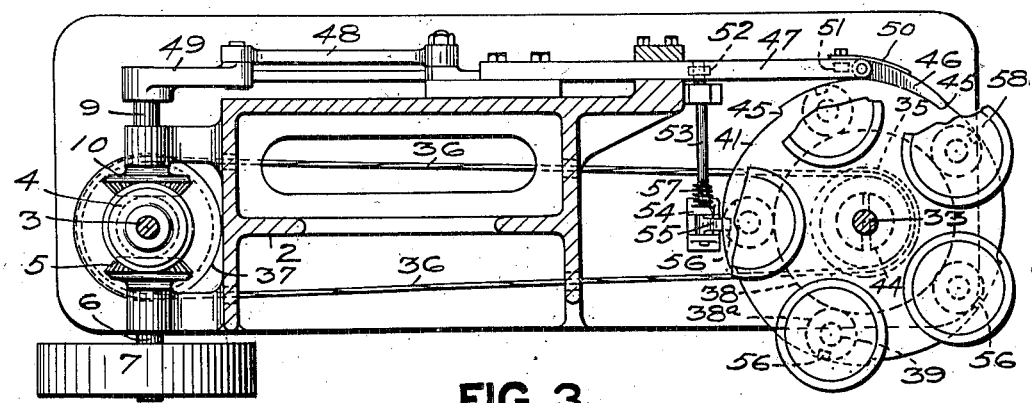

To enable others skilled in the art to make and use my invention I will describe the same more fully, referring to the accompanying drawing, in which Figure 1 is a side view of my improved apparatus; Fig. 2 is a view of the opposite side, partly in section; and Fig. 3 is a section on the line 3—3, Fig. 2; Fig. 4 is a front view of a portion of the machine; Fig. 5 is an enlarged detail of the shaper; and Fig. 6 is a vertical section of the forming block and the hollow head which supports same.

Like numerals indicate like parts.

In the accompanying drawing the numeral 2 designates a suitable frame formed of cast metal and journaled in the rear of said frame is the vertical shaft 3. This shaft 3 carries the bevel pinion 4 which meshes with the bevel pinions 5 on the shaft 6 which carries the pulley 7 connected up by a belt 8 to any suitable motor. A shaft 9 has the bevel pinion 10 which also meshes with the bevel pinion 4 on the vertical shaft 3 for the purpose hereinafter set forth.

At the upper end of the vertical shaft 3 is the bevel pinion 11 which meshes with the like pinion 12 on the shaft 13, journaled in bearings 14 in the frame 2. On the outer end of the shaft 13 is the eccentric 15 having the wrist pin 16 which engages the block 17 mounted in the sliding cross-head 18. This cross-head 18 moves up and down in the guide 19. To provide for this vertical movement of the cross-head 18 said head is provided with the slot or opening 20 in which the block 17 is adapted to move. A rod 21 engages the opening 22 in the cross-head 18 and an opening 23 in a lug 24 on the stationary frame. This rod 21 has the key 25 which engages a keyway in the block 18 and the lug 24 so as to prevent the rotation of said rod but permits of its vertical movement. At the upper end of the rod 21 is the collar 26 and interposed between said collar 26 and the ledge 27 of the sliding block 18 is the spring 28. The rod 21 has the stop 29 secured thereto which controls the downward movement of said rod by coming in contact with the lug 24. A collar 30 is secured to the lower end of said rod and interposed between said collar and the lug 24 is the spring 31. Secured to the lower end of the rod 21 is the knife or shaper 32, which may be of any suitable construction according to the configuration to be given to the article to be formed.

A vertical shaft 33 is journaled in bearings 34 at its upper end and said shaft extends down through suitable bearings in the frame 2, and at its lower end it is provided with the sheave 35 which is connected up by a belt 36 to the sheave 37 on the vertical shaft 3. Secured to the shaft 33 is the friction wheel 38 which may have a rubber or other suitable face, said friction wheel being adapted to engage and drive the several friction wheels 38ª at the lower end of the vertical spindles 39. These vertical spindles 39 are carried by the rotary table 40 which consists of a suitable casting having the upper and lower plates 41 and 42 with bearings 43 for said spindles. This table 40 while mounted on the shaft 33 does not rotate with said shaft but is supported thereon by the collar 44 so as to be rotated independently of said shaft. The upper plate 41 of this table 40 has notches 45 formed at intervals therein and a spring pawl 46 on the pawl-arm 47 is adapted to engage said notches and impart an intermittent rotary movement to said table. The pawl-arm 47 moves in suitable guides in the frame and connected to said arm is the link 48 which is connected to the crank 49 on the shaft 9. The pawl 45 is pivoted to the outer end of the pawl-arm 47 and a spring 50 acts to force said pawl into engagement with the notches of the plate 41. Projecting downwardly from the pawl-arm 47 is the pin 51 which is adapted to engage the upright arm 52, said arm being connected at its lower end to the rod 53, which is rocked by the movement of the arm 52. This rod 53 is supported in brackets 54 and secured to said rod is the latch 55 which is adapted to engage the notches 56 in the periphery of the plate 42 and lock said plate in position, all as fully hereinafter set forth. A spring 57 on the rod 53 is adapted to throw the latch 55 normally into engagement with the plate 42.

Mounted on the spindles 39 are the hollow heads 58 which are adapted to support the mold-rings 59. These rings have the beveled seat 60 which is adapted to receive the plaster of paris forming-block 61. The upper faces of these forming-blocks are shaped to conform to the inner face of the article to be formed, such as a platter, and the clay is placed upon the upper faces of these formers before they are placed upon the machine, as fully hereinafter set forth.

The operation of my improved machine is as follows. The clay from which the articles are to be formed is placed upon the forming blocks at a separate table and the clay is forced down over the formers so as to cover the same, and form the inner face of the platter, whereupon the formers are then placed in the rings 59 and carried to the machine where they are placed upon the hollow heads 58. Power is then applied to operate the machine, whereupon through the friction wheel 37 engaging the friction wheel 38 on the spindles 39 a rapid rotary movement is imparted to the heads 58 carrying the forming blocks. At the same time the shaft 13 revolves and with it the eccentric 15. As the eccentric rotates the rod 21 is lowered carrying with it the shaping knife 32. The parts are so adjusted that the first part of the movement of the eccentric lowers the rod 21 until the shaping knife comes in contact with the clay and the stop 29 in contact with the lug 24, whereupon no further lowering of the rod takes place but it remains in that position for about one-third of the rotation of the eccentric. To provide for this is the purpose of the spring 28 which takes up the motion during the rotation of the eccentric when the stop 29 is in contact with lug 24 and the knife is in contact with the clay. The spindles rotating at a high rate of speed with the forming knife in contact with the clay form the bottom of the platter rapidly and accurately and further rotation of the eccentric raises the rod 21 to its former position. In the meantime the pawl-arm 47 has been moving back to bring the pawl 46 into position to engage the next succeeding tooth on the plate 42. Just before the pawl reaches that tooth the pin 51 on the pawl-arm 47 strikes the arm 52 and rocks the arm 53 so as to withdraw the latch 55 from the notch in the plate 42. The latch bears against the periphery of the plate 42 until the pawl-arm has carried the plate 42 around in position to bring another piece of ware in shape for operation whereupon the latch 55 will be forced by the spring 57 into the next notch on the plate. In this position of the parts another piece of ware is brought into position under the forming knife and the operation as above is repeated.

In the operation of the machine it only requires boys to lift off the rings carrying the finished plate after it has passed from under the forming knife, and another boy to place the rings carrying the clay onto the machine. The device when once set in operation works automatically so that no skilled attendants are required, while at the same time by having a number of spindles mounted upon the table the output of the machine is greatly increased and at the same time the cost of production greatly reduced.

The parts of the machine may be adjusted for different articles of ware and when once adjusted there will be a uniformity of ware not possible to be produced where the operation of the machine depends on the eye of the operator.

What I claim is:

1. In apparatus for shaping or forming plastic articles, the combination of a suitable frame, a support for the article, mechanism for rotating said support, a shaft, an eccentric on said shaft, a rod, a shaper on said rod, connections between said eccentric and said rod, means for checking the downward movement of said rod before said eccentric completes its stroke, and means for taking up the movement of the eccentric during this period.

2. In apparatus for shaping or forming plastic articles, the combination of a suitable frame, a support for the article, mechanism for rotating said support, a shaft, an eccentric on said shaft, a cross-head connected to said eccentric, a slidable rod carried by said cross-head, a shaper on said rod, an abutment in the path of said rod, and a spring interposed between said cross-head and said rod.

3. In apparatus for shaping or forming plastic articles, the combination of a suitable frame, a support for the article, mechanism for rotating said support, a shaft, an eccentric on said shaft, a cross-head connected to said eccentric having projections, a slidable rod supported on the lower end of said projections, a shaper on said rod, an abutment in the path of said rod, and a spring interposed between the upper projection on said cross-head and said rod.

4. In apparatus for shaping or forming plastic articles, the combination of a suitable frame, a support for the article, mechanism for rotating said support, a reciprocating member, mechanism for reciprocating same, a rod carried by said reciprocating member slidable therein, a shaper on said rod, an abutment in the path of said rod, and a spring interposed between said reciprocating member and said rod.

5. In apparatus for shaping or forming plastic articles, the combination of a suitable frame, a support for the article, mechanism for rotating said support, a reciprocating member, mechanism for reciprocating same, a rod carried by said reciprocating member slidable therein, a shaper on said rod, an abutment in the path of said rod, a spring interposed between said reciprocating member and said rod, and a second spring interposed between an enlargement on said rod and said abutment.

6. In apparatus for shaping or forming plastic articles, the combination of a suitable frame, a vertical shaft, means for driving said shaft, a table loosely mounted on said shaft, a series of spindles on said table, a friction wheel on said shaft, friction wheels on said spindles engaged by said first wheel, supports for the articles carried by said spindles, a reciprocating shaper above said table, and means for imparting an intermittent movement to said table.

In testimony whereof, I the said WILLIAM POLK have hereunto set my hand.

WILLIAM POLK.

Witnesses:
   ROBERT C. TOTTEN,
   ROBT. D. TOTTEN.